United States Patent
Ooike et al.

(10) Patent No.: US 8,329,774 B2
(45) Date of Patent: Dec. 11, 2012

(54) ORGANOSILICON COMPOUNDS WHICH HAVE OXETANYL GROUPS, AND A METHOD FOR THE PRODUCTION AND CURABLE COMPOSITIONS OF THE SAME

(75) Inventors: Sayaka Ooike, Nagoya (JP); Hiroshi Suzuki, Tokyo (JP); Akinori Kitamura, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 12/812,808

(22) PCT Filed: Jan. 9, 2009

(86) PCT No.: PCT/JP2009/050213
§ 371 (c)(1),
(2), (4) Date: Nov. 8, 2010

(87) PCT Pub. No.: WO2009/090916
PCT Pub. Date: Jul. 23, 2009

(65) Prior Publication Data
US 2011/0054063 A1  Mar. 3, 2011

(30) Foreign Application Priority Data

Jan. 15, 2008 (JP) ................. 2008-005425
Feb. 6, 2008 (JP) ................. 2008-026796

(51) Int. Cl.
C08J 3/28 (2006.01)
C07F 7/02 (2006.01)
C08G 77/00 (2006.01)
B05D 3/02 (2006.01)

(52) U.S. Cl. ........... 522/148; 549/214; 528/10; 427/387

(58) Field of Classification Search ........................ None
See application file for complete search history.

(56) References Cited

U.S. PATENT DOCUMENTS

| | | | |
|---|---|---|---|
| 5,463,084 A * | 10/1995 | Crivello et al. ............ 549/214 |
| 6,096,903 A * | 8/2000 | Moszner et al. ........... 549/214 |
| 6,121,342 A * | 9/2000 | Suzuki et al. ............. 522/148 |
| 6,624,236 B1 * | 9/2003 | Bissinger et al. .......... 524/588 |
| 6,743,510 B2 * | 6/2004 | Ochiai ........................ 428/413 |
| 6,852,822 B1 * | 2/2005 | Bissinger et al. ........... 528/32 |
| 2004/0197698 A1 * | 10/2004 | Tamaki et al. ............ 430/270.1 |
| 2005/0100772 A1 * | 5/2005 | Ono ............................. 429/33 |
| 2006/0132539 A1 * | 6/2006 | Hino et al. .................. 347/47 |
| 2007/0055034 A1 | 3/2007 | Tajima et al. |
| 2007/0248828 A1 * | 10/2007 | Yoneyama et al. ........... 428/421 |
| 2008/0033137 A1 * | 2/2008 | Tauchi et al. ................ 528/27 |
| 2008/0293875 A1 * | 11/2008 | Hatanaka ..................... 524/588 |
| 2009/0087573 A1 * | 4/2009 | Saito et al. ................. 427/421.1 |
| 2010/0280210 A1 | 11/2010 | Kitamura et al. |

FOREIGN PATENT DOCUMENTS

| | | |
|---|---|---|
| CN | 1753936 A | 3/2006 |
| JP | 11 29640 | 2/1999 |
| JP | 11 199673 | 7/1999 |
| JP | 2001 342194 | 12/2001 |
| JP | 2005 89697 | 4/2005 |
| JP | 2006 131849 | 5/2006 |
| JP | 2006 131850 | 5/2006 |
| JP | 2006 152086 | 6/2006 |
| JP | 2008 150404 | 7/2008 |
| JP | 2008 231333 | 10/2008 |
| JP | 2009 24176 | 2/2009 |
| WO | 2004 076534 | 9/2004 |

OTHER PUBLICATIONS

International Search Report issued May 12, 2009 in PCT/JP09/50213 filed Jan. 9, 2009.
U.S. Appl. No. 12/989,331, filed Dec. 7, 2010, Ooike, et al.
Chinese Office Action issued Apr. 18, 2012 in patent application No. 200980102245.2 with English translation.

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

The object of the present invention is to provide an organosilicon compound having an oxetanyl group, which has a high proportion of an inorganic part in the structure, which, after production thereof, is stable with no gelling, and which has excellent storage stability when it is formed into a composition, and a production method thereof and a curable composition. The organosilicon compound is a compound having an oxetanyl group obtained by a method including a process in which a silicon compound A represented by the formula (1) and a silicon compound B having four siloxane bond-forming groups are subjected to hydrolysis and condensation at a ratio of 0.3 to 2.8 mol of silicon compound B based on 1 mol of silicon compound A.

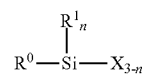

(1)

[In the formula, $R^0$ is an organic group having an oxetanyl group, $R^1$ is an alkyl group having 1 to 6 carbon atoms, an aralkyl group having 7 to 10 carbon atoms, an aryl group having 6 to 10 carbon atoms, or an organic group having an oxetanyl group, X is a hydrolyzable group, and n is 0 or 1.]

18 Claims, No Drawings

ORGANOSILICON COMPOUNDS WHICH HAVE OXETANYL GROUPS, AND A METHOD FOR THE PRODUCTION AND CURABLE COMPOSITIONS OF THE SAME

FIELD OF THE INVENTION

The present invention relates to an organosilicon compound having an oxetanyl group and a production method thereof, and a curable composition. More specifically, the present invention relates to a condensed organosilicon compound which is obtained by hydrolytically condensing a silicon compound having an oxetanyl group and having two or three hydrolyzable groups together with a silicon compound having four siloxane-bond forming groups, and which is in susceptible to gelation, and a production method thereof, and a curable composition containing the organosilicon compound.

BACKGROUND ART

A process for the production of an organosilicon compound having an oxetanyl group and a composition containing the organosilicon compound have been known configured to produce the compound by hydrolytically condensing a silicon compound having four siloxane-bond forming groups together with a silicon compound having an oxetanyl group and having three hydrolyzable groups in the presence of an acid catalyst (see, Patent Document 1). However, the organosilicon compound obtained by hydrolytic condensation in the presence of an acid catalyst are sometimes gelated during storage depending on the storage condition, so that the compound itself and the composition containing it are restricted in usage depending on a purpose of use.

Further, in case of producing an organosilicon compound having an oxetanyl group by hydrolytically condensing a silicon compound (s1) having an oxetanyl group and having three OR groups (R is a hydrocarbon group) together with a silicon compound (s2) having four OR groups (R is a hydrocarbon group) under an acidic condition according to Patent Document 1, the ratio of OR groups in the produced organosilicon compound has been higher, at least by 9%, than the total amount of the OR groups in the silicon compound (s1) and the OR groups in the silicon compound (s2). This has resulted in a cured product, which is susceptible to gelation and which is insufficient in hardness, wear resistance, and the like.

Moreover, a process for the production of an organosilicon compound having an oxetanyl group and a composition containing the organosilicon compound have been also known configured to produce the compound by hydrolytically condensing a silicon compound having an oxetanyl group and having three hydrolyzable groups under an alkaline condition (See, Patent Document 2 and 3). However, it is not disclosed to increase a ratio of inorganic moiety in the obtained organosilicon compound, so as to improve hardness, wear resistance, and the like.

A condensate free of gelation is obtained by hydrolytically condensing a silicon compound having an oxetanyl group and having three hydrolyzable groups together with a silicon compound having three siloxane-bond forming groups such as methyltriethoxysilane, under an acidic condition according to Example 1 in Patent Document 1. On the other hand, a disclosure has been provided that gelation was caused in case of trying to hydrolytically condense the compound under an alkaline condition in Comparative Example 1 in Patent Document 1. Namely, this implies an obstructive factor in combining the technique in Patent Document 1 and techniques in Patent Documents 2 and 3.

[Patent Document 1] WO 2004/076534
[Patent Document 2] JP-A H11-029640
[Patent Document 3] JP-A H11-199673

DISCLOSURE OF THE INVENTION

Problems that the Invention is to Solve

The object of the present invention is to provide an organosilicon compound having an oxetanyl group which has a high proportion of an inorganic part in the structure, is excellent in solubility in an organic solvent, is stable with no gelling after the production thereof, and is excellent in storage stability when the organosilicon compound is prepared into a composition, and a production method thereof, and a curable composition which leads to a cured product having a higher hardness and an excellent wear resistance.

Means for Solving the Problems

The above-mentioned problems are solved and the present Invention is as follows.

1. An organosilicon compound having an oxetanyl group, characterized in that the organosilicon compound is obtained by a method comprising a process in which a silicon compound (A) represented by the general formula (1) and a silicon compound (B) represented by the general formula (2) are subjected to hydrolysis condensation under an alkaline condition, at a ratio of 0.3 to 2.8 mol of the silicon compound (B) based on 1 mol of the silicon compound (A).

[In the formula, $R^0$ is an organic group having an oxetanyl group, $R^1$ is an alkyl group having 1 to 6 carbon atoms, an aralkyl group having 7 to 10 carbon atoms, an aryl group having 6 to 10 carbon atoms, or an organic group having an oxetanyl group, X is a hydrolyzable group, and n is 0 or 1.]

[In the formula, Y is a siloxane-bond forming group.]

2. The organosilicon compound having an oxetanyl group according to 1 above, wherein the organosilicon compound comprises a silicate unit represented by [$SiO_{4/2}$] and a silsesquioxane unit represented by [$R^0SiO_{3/2}$].

3. The organosilicon compound having an oxetanyl group according to 1 or 2 above, wherein $R^0$ in the general formula (1) is an organic group represented by the general formula (3).

[In the formula, $R^3$ is a hydrogen atom or an alkyl group having 1 to 6 carbon atoms, and $R^4$ is an alkylene group having 2 to 6 carbon atoms.]

4. The organosilicon compound having an oxetanyl group according to 1 above, wherein X in the general formula (1) is an alkoxy group, a cycloalkoxy group or an aryloxy group.

5. A method for producing an organosilicon compound having an oxetanyl group according to 1 above, characterized in that the method comprises a process in which a silicon compound (A) represented by the general formula (1) and a silicon compound (B) represented by the general formula (2) are subjected to hydrolysis condensation under an alkaline condition, at a ratio of 0.3 to 2.8 mol of the silicon compound (B) based on 1 mol of the silicon compound (A).

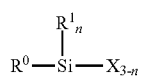   (1)

[In the formula, $R^0$ is an organic group having an oxetanyl group, $R^i$ is an alkyl group having 1 to 6 carbon atoms, an aralkyl group having 7 to 10 carbon atoms, an aryl group having 6 to 10 carbon atoms, or an organic group having an oxetanyl group, X is a hydrolyzable group, and n is 0 or 1.]

   (2)

[In the formula, Y is a siloxane-bond forming group.]

6. The method for producing an organosilicon compound having an oxetanyl group according to 5 above, wherein $R^0$ in the general formula (1) is an organic group represented by the general formula (3).

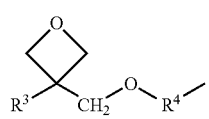   (3)

[In the formula, $R^3$ is a hydrogen atom or an alkyl group having 1 to 6 carbon atoms, and $R^4$ is an alkylene group having 2 to 6 carbon atoms.]

7. The method for producing an organosilicon compound having an oxetanyl group according to 5 above, wherein the amount of a basic substance for alkaline condition is in the range from 1 to 20 mol based on 100 mol of the total mol number of the silicon compound (A) and the silicon compound (B).

8. The method for producing an organosilicon compound having an oxetanyl group according to 7 above, wherein the basic substance is a tetraalkylammonium hydroxide.

9. A cationic curable composition characterized by comprising an organosilicon compound having an oxetanyl group according to 1 above, and a cationic polymerization initiator.

10. The cationic curable composition according to 9 above, wherein the cationic polymerization initiator is a photo cationic polymerization initiator.

11. The cationic curable composition according to 9 or 10 above, wherein the composition further comprises other cationic polymerizable compound, and wherein the cationic polymerizable compound is a compound selected from the group consisting of an epoxy compound, other compound having an oxetanyl group, and a vinylether compound.

12. A method for producing a cured film, characterized by comprising a coating process in which a cationic curable composition according to 9 above is coated on a surface of a base material to obtain a coating film and a curing process in which the coating film is cured.

13. A method for producing a cured film, characterized by comprising a coating process in which a cationic curable composition according to 11 above is coated on a surface of a base material to obtain a coating film and a curing process in which the coating film is cured.

14. A method for producing an article having a cured film, characterized by comprising a coating process in which a cationic curable composition according to 9 above is coated on a surface of a base material to obtain a coating film and a curing process in which the coating film is cured.

15. The method for producing an article having a cured film according to 14 above, wherein the base material is a substrate comprising a polycarbonate resin.

16. An article having a cured film, characterized by obtaining by the method according to 14 above.

Effect of the Invention

The organosilicon compound having an oxetanyl group of the present invention has a high proportion of an inorganic part in the structure, is excellent in solubility in an organic solvent and is stable with no gelling after the production thereof, and is excellent in storage stability when the organosilicon compound is prepared into a composition. And a cured product obtained by using a curable composition containing the organosilicon compound having an oxetanyl group has a higher hardness and an excellent wear resistance.

It is noted that the term "ratio of inorganic moiety" means a ratio of a moiety including no carbon atoms as atoms constituting an applicable compound, relative to the whole structure of the compound.

According to the production method of an organosilicon compound having an oxetanyl group of the present invention, it is possible to produce an organosilicon compound, which is stable without bringing about gelation after production. In the case where the silicon compound (A) in which at least one X is an OR group (R is a hydrocarbon group selected from the group of an alkyl group, a cycloalkyl group, an aralkyl group and an aryl group) in the general formula (1), and the silicon compound (B) in which at least one Y is an OR group (R is a hydrocarbon group selected from the group of an alkyl group, a cycloalkyl group, an aralkyl group and an aryl group) in the general formula (2) are used as a starting material, the ratio of OR groups derived from the silicon compounds (A) and (B) in the obtained organosilicon compound is exemplarily allowed to be 8% or less relative to the total amount of OR groups contained in these starting silicon compounds before production. Further, this organosilicon compound is remarkably excellent in storage stability.

According to the cationic curable composition of the present invention, a cured product can be obtained which has a higher hardness and an excellent wear resistance.

According to the production method of the cured film of the present invention, a cured film having a higher hardness and an excellent wear resistance can be efficiently formed on a base material.

Moreover, according to the production method of the article having a cured film of the present invention, an article having a base material and a cured film which is formed on the base material and has a higher hardness and an excellent wear resistance, can be efficiently produced.

BEST MODE FOR CARRYING OUT THE INVENTION

1. Organosilicon Compound Having Oxetanyl Group and Production Method Thereof The organosilicon compound having an oxetanyl group of the present invention is characterized in that the organosilicon compound (hereinafter, referred to as "organosilicon compound (C)") is obtained by a method comprising a process in which a silicon compound (A) represented by the following general formula (1) and a silicon compound (B) represented by the following general formula (2) are subjected to hydrolysis condensation under an alkaline condition, at a ratio of 0.3 to 2.8 mol of the silicon compound (B) based on 1 mol of the silicon compound (A).

The production method of the organosilicon compound (C) of the present invention is characterized by including a process in which a silicon compound (A) represented by the following general formula (1) and a silicon compound (B) represented by the following general formula (2) are subjected to hydrolysis condensation under an alkaline condition, at a ratio of 0.3 to 2.8 mol of the silicon compound (B) based on 1 mol of the silicon compound (A).

(1)

[In the formula, $R^0$ is an organic group having an oxetanyl group, $R^1$ is an alkyl group having 1 to 6 carbon atoms, an aralkyl group having 7 to 10 carbon atoms, an aryl group having 6 to 10 carbon atoms, or an organic group having an oxetanyl group, X is a hydrolyzable group, and n is 0 or 1.]

$$SiY_4 \quad (2)$$

[In the formula, Y is a siloxane-bond forming group.]

The silicon compound (A) may be used singly or in combination of two or more types thereof. In addition, the silicon compound (B) may be used singly or in combination of two or more types thereof.

1-1. Silicon Compound (A)

This silicon compound (A) is a silicon compound that has an oxetanyl group and is represented by the above general formula (1). The silicon compound (A) is a component for providing an organosilicon compound (C) to be obtained, with a cationic curability.

In the general formula (1), $R^0$ is an organic group having an oxetanyl group and the organic group is preferably a group having carbon atoms of 20 or less.

The particularly preferred is an organic group having a structure represented by the following general formula (3).

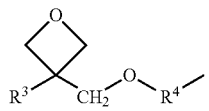
(3)

[In the formula, $R^3$ is a hydrogen atom or an alkyl group having 1 to 6 carbon atoms, and $R^4$ is an alkylene group having 2 to 6 carbon atoms].

In the general formula (3), $R^3$ is preferably an ethyl group. $R^4$ is preferably a linear alkylene group, and particularly is a propylene group (trimethylene group). This is because, it is easy to obtain or synthesize an oxetane compound forming such an organic functional group.

Excessively large numbers of carbon atoms of $R^3$ or $R^4$ scarcely result in obtained organosilicon compound (C) having higher ratio of inorganic moiety, and sometimes result in obtained cured product, which is insufficient in surface hardness.

Additionally, $R^1$ in the general formula (1) indicating the silicon compound (A) is an alkyl group having 1 to 6 carbon atoms, an aralkyl group having 7 to 10 carbon atoms, an aryl group having 6 to 10 carbon atoms, or an organic group having an oxetanyl group. In the case where $R^1$ is an organic group having an oxetanyl group, particularly preferable $R^1$ is an organic group represented by the above general formula (3).

In the general formula (1), X is a hydrolyzable group. The plural Xs may be the same or different from each other. Examples of X include a hydrogen atom, a halogen atom, an alkoxy group, a cycloalkoxy group, an aralkyloxy group, an aryloxy group, and the like. When X is a halogen atom, a hydrogen halogenide is generated in hydrolysis reaction to be described later, thereby requiring that a reaction liquid is controlled to keep alkalinity. For the purpose of preventing the reaction liquid from being turned into an acidic atmosphere and keeping alkalinity, it may also be preferable to previously add a basic substance in an amount exceeding the equivalent of X.

The alkoxy group is preferably an alkoxy group having 1 to 6 carbon atoms. Example thereof includes methoxy group, ethoxy group, n-propoxy group, iso-propoxy group, n-butoxy group, iso-butoxy group, sec-butoxy group, tert-butoxy group, n-pentyl group, n-hexyl group and the like. Among these, an alkoxy group having 1 to 3 carbon atoms is particularly preferred.

The cycloalkoxy group is preferably a cycloalkoxy group having 3 to 8 carbon atoms. Example thereof includes cyclopentyloxy group, cyclohexyloxy group and the like.

The aralkyloxy group is preferably an aralkyloxy group having 7 to 12 carbon atoms. Example thereof includes benzyloxy group, 2-phenylethyloxy group and the like.

The aryloxy group is preferably an aryloxy group having 6 to 10 carbon atoms. Example thereof includes phenyloxy group, o-toluoyloxy group, m-toluoyloxy group, p-toluoyloxy group, naphtyloxy group and the like.

X in the general formula (1) is preferably an alkoxy group having 1 to 3 carbon atoms in the present invention since alkoxy group is excellent in hydrolyzability. Particularly preferred X is a methoxy group, because the source material thereof is readily available, inexpensive, and easy to control a hydrolysis reaction therefor.

In the general formula (1), n is 0 or 1. A silicon compound in which n is 0 has three of hydrolyzable group X, and is also called "T monomer". In turn, the silicon compound in which n is 1 has two of hydrolyzable group X, and is also called "D monomer".

It is preferable to use a silicon compound (A) in which n is 0 to make the organosilicon compound (C) higher in ratio of inorganic moiety.

For the purpose of making the obtained organosilicon compound (C) more excellent in solubility in a solvent to be described later, n is preferably 1.

It is possible to combiningly use a silicon compound (A) where n is 0 and a silicon compound (A) where n is 1 to keep a balance between the above effects.

1-2. Silicon Compound (B)

This silicon compound (B) is represented by the above general formula (2) and is a compound having one silicon atom and four of siloxane-bond forming group Y. The silicon compound (B) is a component having four of siloxane-bond forming group Y, is one for increasing a ratio of inorganic moiety in the organosilicon compound (C), and is also called "Q monomer". The siloxane-bond forming group is configured to form a siloxane bond by a reaction with a hydrolyzable group in the silicon compound (A).

In the general formula (2), Y is a siloxane-bond forming group. The plural Ys may be the same or different from each other. Examples of the siloxane-bond forming group Y include a hydroxyl group, a hydrolyzable group, and the like. The hydrolyzable group may be the same hydrolyzable group as X in the general formula (1).

The siloxane-bond forming group Y is preferably one except a halogen atom and example thereof includes a hydroxyl group, a hydrogen atom, an alkoxy group such as methoxy group, ethoxy group, propoxy group and butoxy group, a cycloalkoxy group such as cyclopentyloxy group and cyclohexyloxy group, an aralkyloxy group such as benzyloxy group and 2-phenylethyloxy group, an aryloxy group such as phenyloxy group, o-toluoyloxy group, m-toluoyloxy group, p-toluoyloxy group and naphtyloxy group, and the like. Among these, an alkoxy group, cycloalkoxy group, aralkyloxy group and aryloxy group are preferable, and particularly preferred is an alkoxy group.

It is noted that, in case of adopting a silicon compound (B) in which the siloxane-bond forming group Y is a halogen atom, the property of the reaction liquid is changed with progression of the reaction in the same manner as the explanation for the hydrolyzable group X in the general formula (1), thereby occasionally making the management troublesome.

The silicon compound (B) is exemplified as follows:
(i) a silicon compound, in which four of siloxane-bond forming group Y are the same of different from each other and each is an alkoxy group, cycloalkoxy group, aralkyloxy group or aryloxy group;
(ii) a silicon compound, in which one siloxane-bond forming group Y is an alkoxy group, cycloalkoxy group, aralkyloxy group or aryloxy group, and the remaining three are the same of different from each other and each is a hydroxyl group or hydrogen atom;
(iii) a silicon compound, in which two of siloxane-bond forming group Y are the same of different from each other and each is an alkoxy group, cycloalkoxy group, aralkyloxy group or aryloxy group, and the remaining two are the same of different from each other and each is a hydroxyl group or hydrogen atom;
(iv) a silicon compound, in which three of siloxane-bond forming group Y are the same of different from each other and each is an alkoxy group, cycloalkoxy group, aralkyloxy group or aryloxy group, and the remaining one is a hydroxyl group or hydrogen atom; and
(v) a silicon compound, in which four of siloxane-bond forming group Y are the same of different from each other and each is a hydroxyl group or hydrogen atom.

Among these, the embodiment (i) is preferable.

Examples of the silicon compound in the embodiment (i) include tetramethoxysilane $Si(OCH_3)_4$, tetraethoxysilane $Si(OC_2H_5)_4$, tetrapropoxysilane $Si(OC_3H_7)_4$, tetrabutoxysilane $Si(OC_4H_9)_4$, and the like. The hydrocarbon group forming the alkoxy group may be linear or branched. The linear hydrocarbon group is preferable since the branched one is susceptible to occurrence of a steric hindrance.

Examples of the silicon compound in the embodiment (ii) include $H_3SiOCH_3$, $H_3SiOC_2H_5$, $H_3SiOC_3H_7$, and the like.

Examples of the silicon compound in the embodiment (iii) include $H_2Si(OCH_3)_2$, $H_2Si(OC_2H_5)_2$, $H_2Si(C_3H_7)_2$, and the like.

Examples of the silicon compound in the embodiment (iv) include $HSi(OCH_3)_3$, $HSi(OC_2H_5)_3$, $HSi(C_3H_7)_3$, and the like.

In addition, examples of the silicon compound in the embodiment (v) include $HSi(OH)_3$, $H_2Si(OH)_2$, $H_3Si(OH)$, $SiH_4$, $Si(OH)_4$, and the like.

The silicon compound (B) is preferably a compound in which all the siloxane-bond forming groups are an alkoxy groups. Particularly preferred is tetramethoxysilane, tetraethoxysilane and tetrapropoxysilane.

When tetrapropoxysilane is used as the silicon compound (B), viscosity increase, gelation, and the like may be suppressed during production of the organosilicon compound (C). Therefore, tetrapropoxysilane is the most preferable compound as the silicon compound (B). cl 1-3. Production Method of Organosilicon Compound (C)

The production method of the organosilicon compound (C) of the present invention includes a process (hereinafter, referred to as "first process") in which a silicon compound (A) represented by the general formula (1) and a silicon compound (B) represented by the general formula (2) are subjected to hydrolysis condensation under an alkaline condition, at a ratio of 0.3 to 2.8 mol of the silicon compound (B) based on 1 mol of the silicon compound (A). In the first process, the silicon compound (A), silicon compound (B), water and a basic substance for alkaline condition are usually used. The present invention may include the following processes after the first process.

(Second process): a process for neutralizing the reaction liquid obtained in the first process with an acid.

(Third process): a process for removing a volatile component from the neutralized liquid obtained in the second process.

(Fourth process): a process for mixing and contacting the concentrated liquid obtained in the third process with an organic solvent for washing, thereby dissolving at least an organosilicon compound (C) in the organic solvent for washing.

(Fifth process): a process for washing the organic liquid obtained in the fourth process with water, and thereafter obtaining an organic solution containing the organosilicon compound (C).

(Sixth process): a process for removing a volatile component from the organic solution obtained in the fifth process.

The production method of the organosilicon compound (C) of the present invention includes preferably the first, second and fifth processes.

1-3-1. First Process

The first process is a process in which the silicon compound (A) and the silicon compound (B), as mentioned above, are subjected to hydrolysis condensation by using them at a particular ratio under an alkaline condition.

The lower limit of the ratio of the silicon compound (B) to be used in the reaction is 0.3 mol, preferably 0.4 mol, more preferably 0.5 mol, and further preferably 0.9 mol relative to 1 mol of the silicon compound (A). In addition, the upper limit of the ratio of the silicon compound (B) to be used in the reaction is 2.8 mol, preferably 2.6 mol, more preferably 2.5 mol, and further preferably 2.1 mol relative to 1 mol of the silicon compound (A).

Usage ratio within the above-mentioned range restricts a volumetric shrinkage of a composition containing the obtained organosilicon compound (C) when the composition is cured. The usage ratio of the silicon compound (B) at 0.9 mol or more leads to not only restricting effect of the volumetric shrinkage but also excellent adherence between a cured product and a base material when the composition containing the organosilicon compound (C) is cured on the base material.

In the first process, excessively lower usage ratio of the silicon compound (B) results in lower ratio of the inorganic moiety in the obtained organosilicon compound (C), and a cured product obtained using a composition containing the silicon compound (C) may be insufficient in surface hardness and heat resistance. On the other hand, excessively higher usage ratio of the silicon compound (B) sometimes fails to produce an organosilicon compound (C) due to viscosity increase or gelation during the production of the organosilicon compound (C), or sometimes results in the organosilicon compound (C), which is susceptible to viscosity increase or gelation and is thus deteriorative in storage stability.

Water is an indispensable component for hydrolyzing a hydrolyzable group included in the starting silicon compound (the silicon compound (A); and the silicon compound (B) in case of having a hydrolyzable group). The amount of water to be used is preferably in the range from 0.5 to 10 mol, and more preferably from 1 to 5 mol relative to 1 mol of the hydrolyzable group.

If the amount of water to be used is too little, the reaction may be insufficiently progressed. On the other hand, if the amount of water is too much, a process for removing water after reaction may be longer, being uneconomical.

The reaction condition is to keep the reaction system alkaline, i.e., it is required to attain a pH exceeding 7. The pH is preferably exceeding 8, and more preferably exceeding 9. The upper limit of the pH is usually 13. Keeping the reaction system at such a pH enables to produce an organosilicon compound excellent in storage stability at a higher yield.

If the reaction condition is acidic (less than pH 7), the resulting organosilicon compound by hydrolytic condensation may be one inferior in storage stability and may be gelated during storage.

Additionally, under a neutral condition (near pH 7), the hydrolytic condensation reaction is difficult to progress, thereby failing to obtain the targeted organosilicon compound, at a higher yield.

The targeted organosilicon compound is obtainable at a higher yield in case of production under a condition exceeding pH 13, similarly to those cases of pH 8 to pH 13. However, the amount of a basic substance for achieving the condition is considerably increased, so that such a condition is uneconomical and also results in an increased cost for neutralizing the reaction liquid after completion of the reaction.

The basic substance used for making the reaction system alkaline in the first process acts as a reaction catalyst for smoothly progressing the hydrolysis condensation reaction between the silicon compound (A) and silicon compound (B). Examples of the basic substance include ammonia, an organic amine, tetramethylammonium hydroxide, tetraethylammonium hydroxide, tetrapropylammonium hydroxide, tetrabutylammonium hydroxide, choline, sodium hydroxide, potassium hydroxide, calcium hydroxide and the like. Among these, an ammonium compound having a quaternary nitrogen atom leading an excellent catalytic activity is preferable, and tetramethylammonium hydroxide is more preferable.

The amount of the basic substance to be used is preferably in the range from 1 to 20 mol relative to 100 mol of the total mol number of the silicon compound (A) and silicon compound (B) for the purpose of adjusting to the preferable pH of the reaction system. If the amount of the basic substance is too little, the progression of the hydrolysis condensation reaction may be slower and sometimes make the reaction time longer. In turn, excessively larger amount of the basic substance fails to obtain remarkably an improved effect on reaction efficiencies, and is thus uneconomical.

It is preferable to use an organic solvent as the reaction solvent in the first process. Examples of the preferable organic solvent as the reaction solvent include an alcohol as methyl alcohol, ethyl alcohol and isopropyl alcohol, a ketone such as methyl ethyl ketone, an ether such as tetrahydrofurane and 1,4-dioxane, an aromatic hydrocarbon such as toluene, benzene and xylene, an aliphatic hydrocarbon such as hexane, ligroin, and the like. The organic solvent may be used singly or in combination of two or more types thereof. The alcohol is excellent in solubility of the starting silicon compounds and the resulting product in the alcohol, and is a preferable organic solvent.

The reaction temperature for the first process is preferably in the range from 0° C. to 120° C., more preferably from 10° C. to 100° C., and further preferably from 40° C. to 80° C. When the reaction temperature is in the range from 40° C. to 80° C., it is possible to restrict by production of a high molecular weight component, and to obtain an organosilicon compound (C), which is in susceptible to gelation, has a number-average molecular weight to be described later, and is sharper in molecular weight distribution.

In addition, the reaction time for the first process is preferably in the range from 1 to 30 hours, and more preferably from 4 to 24 hours.

The present organosilicon compound (C) obtained by the hydrolysis condensation reaction according to the first process is a polysiloxane having a siloxane bond that is formed by a hydrolyzable group in the silicon compound (A) and a siloxane-bond forming group in the silicon compound (B). In the first process, most of the hydrolyzable group in the silicon compound (A) and most of the siloxane-bond forming group in the silicon compound (B) are converted into a siloxane bond.

1-3-2. Second Process

The second process is a process in which the reaction liquid obtained in the first process is subjected to neutralization with an acid. Examples of the acid include an inorganic acid such as phosphoric acid, nitric acid, sulfuric acid and hydrochloric acid, an organic acid such as a carboxylic acid including acetic acid, formic acid, lactic acid, acrylic acid, oxalic acid and the like, a sulfonic acid including p-toluenesulfonic acid, methanesulfonic acid, and the like. Among these, nitric acid and sulfuric acid are preferable, because they hardly exert adverse effects on the stability of oxetanyl group (an addition reaction of each acid to an oxetanyl group is hardly caused), and are apt to be relatively readily removed by water washing. The amount of the acid to be used is appropriately selected depending on the pH of a reaction liquid containing the organosilicon compound (C). The amount thereof is preferably in the range from 1 to 1.1 equivalent, and more preferably from 1 to 1.05 equivalent relative to 1 equivalent of the basic substance.

1-3-3. Third Process

The third process is a process in which a volatile component is removed from the neutralized liquid obtained in the second process. In the process, distillation is conducted under a condition of ordinary pressure or reduced pressure. The volatile component to be removed in the third process is mainly an organic solvent used as the reaction solvent in the first process. This third process is usually conducted when such an organic solvent is used, which is compatibly mixed with water, like methanol, because such a solvent is inconvenient for washing by water (fifth process) to be described later.

Even when the reaction solvent in the first process is an organic solvent such as an alcohol, which compatibly mixes with water, the third process and fourth process can be omitted in case that washing of the organosilicon compound (C) can be conducted by adding a large amount of an organic solvent suitable for washing of the neutralized liquid by water.

Alternatively, the third process and fourth process can also be omitted, in case that the reaction solvent in the first process is incompatible with water and is an organic solvent suitable for washing of the neutralized liquid by water, and in case that, although the reaction solvent is an alcohol or the like, which compatibly mixes with water, washing of the organosilicon compound (C) can be conducted by adding a large amount of an organic solvent suitable for washing of the neutralized liquid by water.

1-3-4. Fourth Process

The fourth process is a process in which the concentrated liquid obtained in the third process is subjected to mixing and contacting with an organic solvent for washing to dissolve at least an organosilicon compound (C) in the organic solvent for washing. As the organic solvent for washing, a compound is used which dissolves the organosilicon compound (C) therein and which is incompatible with water. The term "incompatible with water" implies that, when water and the organic solvent for washing are sufficiently mixed with each other and then the mixture is left to stand still, the mixture is separated into a water layer and an organic layer.

Examples of the preferable organic solvent for washing include a ketone such as methyl ethyl ketone; an ether such as diisopropylether; an aromatic hydrocarbon such as toluene; an aliphatic hydrocarbon such as hexane; an ester such as ethyl acetate; and the like.

The organic solvent for washing may be the same as or different from the reaction solvent used in the first process.

1-3-5. Fifth Process

The fifth process is a process in which the organic liquid obtained in the fourth process is washed with water, and an organic solution containing the organosilicon compound (C) is obtained. The organic solution means a liquid obtained in the second process when the third and fourth processes are aborted. By means of the fifth process, the basic substance used in the first process, the acid used in the second process, and the salt thereof are all contained in the water layer, and are substantially removed from the organic layer.

The fifth process includes a process in which the organic liquid is subjected to mixing and contacting with water and a process in which a water layer and an organic layer containing the organosilicon compound (C) is separated and the organic layer (organic solution) is recovered. In these processes, when water is insufficiently mixed and contacted with the organic liquid, or when the separation of the organic layer from the water layer is insufficient, the resulting organosilicon compound (C) sometimes contains a large amount of impurities or exhibits an inferior stability.

The temperature in the process for mixing and contacting water with the organic liquid in the fifth process is not particularly limited and is preferably in the range from 0° C. to 70° C., and more preferably from 10° C. to 60° C. Further, the temperature in the process for separating the organic layer from the water layer is not particularly limited and is preferably in the range from 0° C. to 70° C., and more preferably from 10° C. to 60° C. It is preferable to set the treating temperatures in the two processes at a temperature range of 40° C. to 60° C. from the viewpoint of a shortening effect of the time for separating the organic layer from the water layer.

1-3-6. Sixth Process

The sixth process is a process in which a volatile component is removed from the organic solution obtained in the fifth process.

Distillation is conducted under a condition of ordinary pressure (atmospheric pressure) or reduced pressure in the sixth process. The volatile component to be removed in the sixth process is to be the organic solvent for washing used in the fourth process. If the other volatile components are contained, all are removed simultaneously in this process.

The organosilicon compound (C) of the present invention is separated by the above-mentioned processes.

It is noted that, when the organosilicon compound (C) is to be provided as a solution obtained by dissolving the compound in an organic solvent, it is possible to directly use the organic solvent used in the fourth process as the solvent for the organosilicon compound (C) and to omit the sixth process.

In the production method of the present invention, the organosilicon compound (C) obtained in the first process is stable without degradation nor denaturation during or after treatments in the subsequent processes.

The condensation ratio of the silicon compound (A) and the silicon compound (B) in the production method of the present invention can be 92% or higher, more preferably 95% or higher, and further preferably 98% or higher. Although it is most preferable that substantially all the siloxane-bond forming groups (including a hydrolyzable group) are condensed, the upper limit of the condensation ratio is typically 99.9%.

As mentioned above, it is difficult to perform a uniform copolycondensation reaction of a Q monomer and a T monomer by a known method, and gel is likely formed. Thus, a method is known to avoid gelation, which is configured to cause a silicon compound (hereinafter, referred to as "M monomer") such as a trimethylalkoxysilane, hexamethyldisiloxane, having only one siloxane-bond forming group, to act as an end capping agent.

However, although gelation can be avoided by using an M monomer in a predetermined amount or more, the inorganic property of the obtained organosilicon compound tends to be lowered. In the present invention, the T monomer and or D monomer that are a silicon compound (A) and a Q monomer that is a silicon compound (B) are subjected to copolycondensation under an alkaline condition without causing gelation, it is possible to combinigly use the M monomer at such a lower ratio not to lower the inorganic property. Specifically, it is possible to use the M monomer in an amount of 10 mol or less relative to 100 mol of the total mol number of the silicon compound (A) and silicon compound (B) in the first process.

1-4. Organosilicon Compound (C)

The organosilicon compound (C) of the present invention is a polysiloxane that has an oxetanyl group and a siloxane bond. The organosilicon compound (C) is a compound including a silicate unit represented by $[SiO_{4/2}]$. The silicate unit is a constitutional unit in which four oxygen atoms are bonded to one silicon atom, and is a constitutional unit derived from the silicon compound (B).

The organosilicon compound (C) of the present invention may further include a silsesquioxane unit represented by $[R^0SiO_{3/2}]$ and/or a diorganosiloxane unit represented by $[R^0RiSiO_{2/2}]$. The silsesquioxane unit and diorganosiloxane unit are constitutional units, which include one silicon atoms having three and two oxygen atoms bonded thereto, respectively, and which are derived from the silicon compound (A).

Examples of the organosilicon compound (C) of the present invention include a compound including a silicate unit represented by $[SiO_{4/2}]$ and a silsesquioxane unit represented by $[R^0SiO_{3/2}]$; a compound including a silicate unit $[SiO_{4/2}]$ and a diorganosiloxane unit represented by $[R^0R^1SiO_{2/2}]$; and a compound including a silicate unit $[SiO_{4/2}]$, a silsesquioxane unit represented by $[R^0SiO_{3/2}]$, and a diorganosiloxane unit represented by $[R^0R^1SiO_{2/2}]$. The containment ratios of the respective constitutional units are determined by the amounts of the silicon compounds (A) and (B).

The organosilicon compound (C) of the present invention is preferably a compound including a silicate unit represented by $[SiO_{4/2}]$ and a silsesquioxane unit represented by $[R^0SiO_{3/2}]$ from the viewpoint of an excellent surface hardness and the like of a cured film to be obtained.

The organosilicon compound (C) of the present invention has an organic moiety and an inorganic moiety, in its structure. $R^0$ and $R^1$ in the general formula (1) representing the silicon compound (A) constitute the organic moiety. When a part of at least one of the hydrolyzable group such as an alkoxy group derived from the silicon compound (A) and the hydrolyzable group such as an alkoxy group derived from the silicon compound (B), is remaining, such a residue is also included in the organic moiety. The moiety other than the organic moiety is the inorganic moiety including no carbon atoms.

Since the condensation ratio can be increased to 92% or higher in the production method of the present invention, as mentioned above, it is possible to obtain the organosilicon compound (C) having a higher ratio of inorganic moiety and having a sufficiently formed polysiloxane structure. If the condensation ratio is lowered, a cured film obtained using the organosilicon compound (C) tends to have a deteriorated hardness. Additionally, the storage stability of the organosilicon compound (C) may be deteriorated.

When the organosilicon compound (C) of the present invention has a siloxane-bond forming group (including a hydrolyzable group), the remaining ratio thereof can be calculated from a chart of $^1$H NMR (nuclear magnetic resonance spectral). The fact that "all the hydrolyzable groups have been substantially condensed" can be confirmed by a fact that peaks based on siloxane-bond forming groups are rarely observed in an NMR chart for the obtained organosilicon compound (C).

For example, when the silicon compound (A) used for the production of the organosilicon compound (C) is a compound in which n is 0 in the general formula (1), that is, a T monomer having three hydrolyzable groups, the organosilicon compound (C) to be obtained as a result of hydrolytic condensation reaction of the silicon compound (A) with the silicon compound (B), is made to be a compound having a silsesquioxane unit and a silicate unit as constitutional units.

In the above case, the organosilicon compound (C) is allowed to have a structure in a partially laddered, caged, or randomized shape.

The organosilicon compound (C) of the present invention has an oxetanyl group, and thus possesses a cationic curability. When the organosilicon compound (C) is cationically cured, a cured film can be obtained which is high in surface hardness and excellent in heat resistance.

The number-average molecular weight of the organosilicon compound (C) of the present invention is preferably in the range from 1,000 to 20,000, more preferably from 1,000 to 10,000, and further preferably from 2,000 to 6,000, which is determined relative to polystyrene standards by gel permeation chromatographic (GPC) analysis.

In the present invention, the preferable organosilicon compound (C) (hereinafter, referred to as "organosilicon compound (C1)") is a compound, which is obtained by hydrolysis condensation, under an alkaline condition, of a compound (A) in which $R^0$ is an organic group represented by the general formula (3), n is 0, and at least one X, preferably two of X, and more preferably three of X is/are an OR group (R is a hydrocarbon group selected from an alkyl group, cycloalkyl group, aralkyl group and aryl group), in the general formula (1), and a silicon compound (B) in which at least one Y, preferably two of Y, more preferably three of Y, and particularly four of Y is/are an OR group (R is a hydrocarbon group selected from an alkyl group, cycloalkyl group, aralkyl group and aryl group), in the general formula (2). The ratio of the OR group derived from the silicon compounds (A) and (B) as production starting materials, which OR group is included in the organosilicon compound (C1), is preferably in the range from 0% to 8%, more preferably from 0.1% to 6%, and further preferably from 0.5% to 5% relative to the total amount of OR groups included in the silicon compounds (A) and (B) before production of the organosilicon compound (C1). Conventionally, ratios of such groups have frequently exceeded 8% in case of an organosilicon compound obtained by hydrolytically condensing production starting materials under an acidic condition, such that: the organosilicon compound is insufficient in stability after production; and a cured product, to be obtained when the compound is prepared into curable composition, is insufficient in hardness and the like.

However, the organosilicon compound (C1) is excellent in storage stability, is high in solubility in an organic solvent and thus excellent in workability, and is excellent in hardness, wear resistance, and the like of a cured product when prepared into a curable composition.

2. Cationic Curable Composition

The cationic curable composition of the present invention is characterized by containing the above-mentioned organosilicon compound (C) of the present invention and a cationic polymerization initiator.

The cationic curable composition of the present invention may further contain other cationically polymerizable compound (hereinafter, referred to as "cationically polymerizable compound (D)"), a sensitizer, a thixotropy imparting agent, a silane coupling agent, an anti-foaming agent, a filler, an inorganic polymer, an organic polymer, an organic solvent and the like.

The organosilicon compound (C) is preferably the above-mentioned organosilicon compound (C1), from the viewpoint of curability of the cationic curable composition, hardness and wear resistance of a cured product to be obtained, and the like.

2-1. Cationic Polymerization Initiator

The cationic polymerization initiator is a compound (photo cationic polymerization initiator) for generating a cation by irradiation of light such as ultraviolet rays, or a compound (thermal cationic polymerization initiator) for generating a cation by heating. Known compound may be used as the cationic polymerization initiator. Hereinafter, a composition containing a photo cationic polymerization initiator is called a "photo cationically curable composition", and a composition containing a thermal cationic polymerization initiator is called a "thermally cationically curable composition".

2-1-1. Photo Cationic Polymerization Initiator

Examples of the photo cationic polymerization initiator include an onium salt such as an iodonium salt, a sulfonium salt, a diazonium salt, a selenium salt, a pyridinium salt, a ferrocenium salt and a phosphonium salt. Among these, an iodonium salt and a sulfonium salt are preferable. In particular, an aromatic iodonium salt and an aromatic sulfonium salt are preferable photo cationic polymerization initiators, because they are thermally and relatively stable, and tend to improve storage stability of the curable composition containing the salt.

In the case where the photo cationic polymerization initiator is an iodonium salt or sulfonium salt, examples of a counter anion include $BF_4^-$, $AsF_6^-$, $SbF_6^-$, $PF_6^-$, $B(C_6F_5)_4^-$, and the like.

Examples of the aromatic iodonium salt include (tricumyl)iodonium tetrakis(pentafluorophenyl)borate, diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate, 4-methylphenyl-4-(1-methylethyl)phenyliodonium tetrakis(pentafluorophenyl)borate, and the like.

The commertially available may be used as the aromatic iodonium salt. Example thereof includes "UV-9380C" (product name) manufactured by GE Toshiba Silicone Co., Ltd., "RHODOSIL PHOTOINITIATOR 2074" (product name) manufactured by Rhodia, "WPI-016", "WPI-116" and "WPI-113" (product name) manufactured by Wako Pure Chemical Ind., Ltd., and the like.

Examples of the aromatic sulfonium salt include bis[4-(diphenylsulfonio)phenyl]sulfide bishexafluorophosphate, bis[4-(diphenylsulfonio)phenyl]sulfide bishexafluoroantimonate, bis[4-(diphenylsulfonio)phenyl]sulfide bistetrafluoroborate, bis[4-(diphenylsulfonio)phenyl]sulfide tetrakis(pentafluorophenyl)borate, diphenyl-4-(phenylthio)phenylsulfonium hexafluorophosphate, diphenyl-4-(phenylthio)phenylsulfonium hexafluoroantimonate, diphenyl-4-(phenylthio)phenylsulfonium tetrafluoroborate, diphenyl-4-(phenylthio)phenylsulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis[4-(di(4-(2-hydroxyethoxy))phenylsulfonio)phenyl]sulfide bistetrafluoroborate, bis[4-(di(4-(2-hydroxyethoxy))phenylsulfonio)phenyl]sulfide tetrakis(pentafluorophenyl)borate, and the like.

The commertially available may be used as the aromatic sulfonium salt. Examples of the commertially available triaryl sulfonium salt (aromatic sulfonium salt) include "Cyracure UVI-6990", "Cyracure UVI-6992", and "Cyracure UVI-6974" (product name) manufactured by The Dow Chemical Company, "Adeka Optomer SP-150", "Adeka Optomer SP-152", "Adeka Optomer SP-170", and "Adeka Optomer SP-172" (product name) manufactured by Adeka Corp., "WPAG-593", "WPAG-596", "WPAG-640", and "WPAG-641" (product name) manufactured by Wako Pure Chemical Ind., Ltd., and the like.

Examples of the aromatic diazonium salt include benzenediazonium hexafluoroantimonate, benzenediazonium hexafluorophosphate, benzenediazonium hexafluoroborate, and the like.

The content of the photo cationic polymerization initiator contained in the photo cationically curable composition is preferably in the range from 0.01 to 10 parts by weight, more preferably from 0.1 to 7 parts by weight, and further preferably from 0.2 to 5 parts by weight relative to 100 parts by weight of the total of the cationically polymerizable compound including the organosilicon compound (C). When the content of the photo cationic polymerization initiator is in the above range, curability of the curable composition (the composition can be cured in a short time, thereby enabling to limit an energy cost), and hardness and wear resistance of the obtained cured product are excellent.

2-1-2. Thermal Cationic Polymerization Initiator

Examples of the thermal cationic polymerization initiator include a sulfonium salt, a phosphonium salt, a quaternary ammonium salt, and the like. Among these, a sulfonium salt is preferable.

Examples of a counter anion for the thermal cationic polymerization initiator include $AsF_6^-$, $SbF_6^-$, $PF_6^-$, $B(C_6F_5)_4^-$, and the like.

Examples of the sulfonium salt include triphenylsulfonium tetrafluoroborate, triphenylsulfonium hexafluoroantimonate, triphenylsulfonium hexafluoroarsenate, tri(4-methoxyphenyl)sulfonium hexafluoroarsenate, diphenyl(4-phenylthiophenyl)sulfonium hexafluoroarsenate, and the like.

The commertially available may be used as the sulfonium salt. Example thereof includes "Adeka Opton CP-66" and "Adeka Opton CP-77" (product name) manufactured by Adeka Corp., "Sanaid SI-60L", "Sanaid SI-80L", and "Sanaid SI-100L" (product name) manufactured by Sanshin Chemical Industry Co., Ltd., and the like.

Examples of the phosphonium salt include ethyltriphenylphosphonium hexafluoroantimonate, tetrabutylphosphonium hexafluoroantimonate, and the like.

Examples of the ammonium salt-type compound include N,N-dimethyl-N-benzylanilinium hexafluoroantimonate, N,N-diethyl-N-benzylanilinium tetrafluoroborate, N,N-dimethyl-N-benzylpyridinium hexafluoroantimonate, N,N-diethyl-N-benzylpyridinium trifluoromethanesulfonate, N,N-dimethyl-N-(4-methoxybenzyl)pyridinium hexafluoroantimonate, N,N-diethyl-N-(4-methoxybenzyl) pyridinium hexafluoroantimonate, N,N-diethyl-N-(4-methoxybenzyl)toluidinium hexafluoroantimonate, N,N-dimethyl-N-(4-methoxybenzyl)toluidinium hexafluoroantimonate, and the like The content of the thermal cationic polymerization initiator contained in the thermally cationically curable composition is preferably in the range from 0.01 to 10 parts by weight, more preferably from 0.1 to 7 parts by weight, and further preferably from 0.2 to 5 parts by weight relative to 100 parts by weight of the total of the cationically polymerizable compound including the organosilicon compound (C). When the content of the thermal cationic polymerization initiator is in the above range, curability of the curable composition, and hardness and wear resistance of the obtained cured product are excellent.

2-2. Cationically Polymerizable Compound (D)

The cationically polymerizable compound (D) is a cationically polymerizable compound different from the organosilicon compound (C). Example thereof include an epoxy compound (compound having an epoxy group), other compound having an oxetanyl group (other oxetanyl-group containing compound), a compound having a vinyl ether group (vinyl ether compound), and the like. These compounds may be used singly or in combination of two or more types thereof. An epoxy compound having an alicyclic structure is particularly preferred, since the compound exhibits an effect to smoothly progress a cationic polymerization of an oxetanyl group in the organosilicon compound (C).

Examples of the epoxy compound include a monofunctional epoxy compound, a multifunctional epoxy compound, and the like.

Examples of the multifunctional epoxy compound include dicyclopentadiene dioxide, limonene dioxide, 4-vinylcyclohexene dioxide, (3,4-epoxycyclohexyl)methyl-3,4-epoxycyclohexyl carboxylate (for example, product name "Seloxide 2021P" manufactured by Daicel Chemical Ind., Ltd.), di(3,4-epoxycyclohexyl)adipate, a bisphenol A type epoxy resin, a halogenated bisphenol A type epoxy resin; a hydrogenated bisphenol A type epoxy resin, a bisphenol S type diglycidyl ether, a bisphenol F type epoxy resin, 1,6-hexanediol diglycidyl ether, polytetramethylene glycol diglycidyl ether, a compound obtained by glycidyl etherifying both ends of polybutadiene, an o-cresol novolak type epoxy resin, a m-cresol novolak type epoxy resin, a p-cresol novolak type epoxy resin, a phenol novolak type epoxy resin, trimethylolpropane triglycidyl ether, pentaerythritol tetraglycidyl ether, a compound obtained by internally epoxidizing polybutadiene, a compound obtained by epoxidizing part of double bonds of a styrene-butadiene copolymer (for example, product name "Epofriend" manufactured by Daicel Chemical Ind., Ltd.), a compound obtained by epoxidizing part of an isoprene copolymer moiety of a block copolymer comprising an ethylene-butylene copolymer moiety and the isoprene copolymer moiety (for example, product name "L-207" manufactured by Kraton Performance Polymers Inc.), a compound in a structure obtained by epoxidizing vinyl groups of a ring-opened polymer of 4-vinylcyclohexene oxide (for example, product name "EHPE3150" manufactured by Daicel Chemical Ind., Ltd.), a cage-shaped silsesquioxane having a glycidyl group (for example, "Q-4" in "Q8 serires" manufactured by Mayaterials Inc.), alicyclic type cage-shaped silsesquioxane having an epoxy group (for example, product name "Q-5" in "Q8 serires" manufactured by Mayaterials Inc.), an epoxidized plant oil, and the like.

Examples of the monofunctional epoxy compound include an α-olefin epoxide such as 1,2-epoxy hexadecane, phenyl glycidyl ether, 2-ethylhexyl glycidyl ether, dodecyl glycidyl ether, glycidyl methacrylate, and the like.

Examples of the other oxetanyl-group containing compound include a monofunctional oxetane compound, a multifunctional oxetane compound, and the like.

Examples of the multifunctional oxetane compound include 1,4-bis{[3-ethyl-3-oxetanyl)methoxy]methyl}benzene (XDO), di[2-(3-oxetanyl)butyl]ether (DOX), 1,4-bis[(3-ethyloxetane-3-yl)methoxy]benzene (HQOX), 1,3-bis[(3-ethyloxetane-3-yl)methoxy]benzene (RSOX), 1,2-bis[(3-ethyloxetane-3-yl)methoxy]benzene (CTOX), 4,4'-bis[(3-ethyloxetane-3-yl)methoxy]biphenyl (4,4'-BPDX), 2,2'-bis[(3-ethyl-3-oxetanyl)methoxy]biphenyl (2,2'-BPDX), 3,3',5,5'-tetramethyl[4,4'-bis(3-ethyloxetane-3-yl)methoxy]biphenyl (TM-BPDX), 2,7-bis[(3-ethyloxetane-3-yl)methoxy]naphthalene (2,7-NpDOX), 1,6-bis[(3-ethyloxetane-3-yl)methoxy]-2,2,3,3,4,4,5,5-octafluorohexane (OFHDOX), $3(4),8(9)$-bis[(1-ethyl-3-oxetanyl)methoxymethyl]-tricyclo[$5.2.1.0^{2.6}$]decane, 1,2-bis[2-[(1-ethyl-3-oxetanyl)methoxy]ethylthio]ethane, 4,4'-bis[(1-ethyl-3-oxetanyl)methyl]thiodibenzene thioether, 2,3-bis[(3-ethyloxetane-3-yl)methoxymethyl]norbornane (NDMOX), 2-ethyl-2-[(3-ethyloxetane-3-yl)methoxymethyl]-1,3-0-bis[(1-ethyl-3-oxetanyl)methyl]-propane-1,3-diol (TMPTOX), 2,2-dimethyl-1,3-0-bis[(3-ethyloxetane-3-yl)methyl]-propane-1,3-diol (NPGOX), 2-butyl-2-ethyl-1,3-0-bis[(3-ethyloxetane-3-yl)methyl]-propane-1,3-diol, 1,4-0-bis[(3-ethyloxetane-3-yl)methyl]-butane-1,4-diol, 2,4,6-0-tris[(3-ethyloxetane-3-yl)methyl]cyanurate, an etherified product (BisAOX) of bisphenol A and 3-ethyl-3-chloromethyloxetane (hereinafter, abbreviated to "OXC"), an etherified product (BisFOX) of bisphenol F and OXC, an etherified product (PNOX) of a phenol novolak and OXC, an etherified product (CNOX) of a cresol novolak and OXC, oxetanylsilsesquioxane (OX-SQ), a silicon alkoxide (OX-SC) of 3-ethyl-3-hydroxymethyloxetane, and the like.

Examples of the monofunctional oxetane compound include 3-ethyl-3-(2-ethylhexyloxymethyl)oxetane (EHOX), 3-ethyl-3-(dodecyloxymethyl)oxetane (OXR-12), 3-ethyl-3-(octadecyloxymethyl)oxetane (OXR-18), 3-ethyl-3-(phenoxymethyl)oxetane (PDX), 3-ethyl-3-hydroxymethyloxetane (OXA), and the like.

Examples of the vinyl ether compound include a monofunctional vinyl ether compound, a multifunctional vinyl ether compound and the like.

Examples of the multifunctional vinyl ether compound include cyclohexane dimethanol divinylether, triethylene glycol divinyl ether, a novolak-type divinyl ether and the like.

Examples of the monofunctional vinyl ether compound include hydroxyethyl vinyl ether, hydroxybutyl vinyl ether, dodecyl vinyl ether, propenyl ether propylene carbonate, cyclohexyl vinyl ether and the like.

In the case where the cationic curable composition contains the cationically polymerizable compound (D), the content of the cationically polymerizable compound (D) is preferably in the range from 0.1 to 1,000 parts by weight, more preferably from 1 to 300 parts by weight, and further preferably from 2 to 100 parts by weight, relative to 100 parts by weight of the organosilicon compound (C). When the content of the cationically polymerizable compound (D) is in the above range, curability of the curable composition, and hardness and wear resistance of the obtained cured product are excellent.

2-3. Sensitizer

In the case where the cationic composition of the present invention is a photo cationically curable composition, the composition may contain a photosensitizer.

The photosensitizer is preferably used a photo-radical polymerization initiator. The typical photosensitizer usable in the present invention is a compound disclosed by Crivello in "Advanced in Polymer Science" (Adv. in Polymer. Sci., 62, 1 (1984)). Specific examples thereof include a pyrene, a perylene, an acridine orange, a thioxanthone, a 2-chlorothioxanthone, a benzoflavin and the like. Among these, a thioxanthone is particularly preferable, because the compound exhibits an effect to enhance an activity of a photo cationic polymerization initiator such as an onium salt.

In the case where the photo cationically curable composition contains a photosensitizer, the content of the photosensitizer is preferably in the range from 0.5 to 10 parts by weight, more preferably from 1 to 8 parts by weight, and further preferably from 3 to 6 parts by weight relative to 100 parts by weight of the total cationically polymerizable compound including the organosilicon compound (C). When the content of photosensitizer (D) is in the above range, curability of the curable composition, and hardness and wear resistance of the obtained cured product are excellent.

2-4. Organic Solvent

The organic solvent may be either a compound capable of dissolving the organosilicon compound (C), or a compound incapable of dissolving the organosilicon compound (C), or both compounds can be used combinedly. When the organic solvent is the above compound capable of dissolving the organosilicon compound (C), or is such a mixture that is obtained by combiningly using both compounds and is capable of dissolving the organosilicon compound (C), the cationic curable composition to be obtained thereby is excellent in workability, film-formability, and the like in using the same.

The photo cationically curable composition and the thermally cationically curable composition can be obtained by mutually mixing starting material components. Upon mixing, it is enough to use a conventionally known mixer or the like. Specific examples thereof include a reaction flask, a change-can type mixer, a planetary mixer, a disper, a Henschel mixer, a kneader, an ink roll, an extruder, a three-roll mill, a sand mill, and the like.

The cationic curable composition of the present invention can be cationically cured by a method such as a method to irradiate an active energy beam, a heating method, and a method to combiningly use the method to irradiate an active energy beam and the heating method.

Examples of the active energy beam include an electron beam, ultraviolet rays, and visible light, and ultraviolet rays are particularly desirable.

3. Process for Producing Cured Film, Article Having the Cured Film and Process for Producing the Same The production method of a cured film of the present invention is characterized by comprising a coating process in which the above-mentioned cationic curable composition of the present invention is coated on a surface of a base material to obtain a coating film and a curing process in which the coating film is cured.

In addition, the production method of an article having a cured film is characterized by comprising a coating process in which the above-mentioned cationic curable composition of the present invention is coated on a surface of a base material to obtain a coating film and a curing process in which the coating film is cured.

When the cationic curable composition contains an organic solvent, the composition is to be cured by volatilizing the organic solvent after forming a coated film.

The base material is not particularly limited, and a constituent material of the base material may be an organic material or an inorganic material. Specifically usable are a metal, alloy, glass, ceramic, resin, paper, wood, concrete, and the like. Examples of a shape thereof include a finite form such as a film, a sheet, a plate including flat plate and curved plate, a cube, a rectangular parallelepiped, a pyramid, a cone, a linear body including straight and curved, a ring-shaped body including circular and polygonal, a tube and a sphere, and an indefinite form having irregularities, grooves, through-holes, corners, and the like.

The base material is preferably a substrate (which is typically a flat plate) containing a resin. Examples of the resin include a polyester resin, a polycarbonate resin, an ABS resin, an ASA resin, an AES resin, a polystyrene, a styrene acrylonitrile copolymer, a styrene maleic anhydride copolymer, a (meth)acrylate styrene copolymer, a polyethylene, a polypropylene, a polyarylate resin, a polyvinylchloride resin, an acrylic resin, a polyphenylene ether, a polyphenylene sulfide, a fluororesin, a polyether ketone, a polyetheretherketone, a polysulfone, a polyether sulfone, a phenoxy resin and the like. The resin is preferably a polycarbonate resin.

The forming method of the coating film is not particularly limited and is appropriately selected depending on the constituent material, shape and the like of the base material. When the base material is in a flat plate shape such as a film and sheet, it is possible to form a coating film thereon by using an applicator, bar coater, wire-bar coater, roll coater, curtain flow coater, or the like. It is also possible to adopt a dip coating method, scat method, spraying method, and the like.

The curing method and the curing conditions of the cationic curable composition are selected, depending on whether the cationic curable composition is photo-curable or heat-curable. Further, the curing conditions (a light source type, photoirradiation quantity, and the like in case of photo-curing; and a heating temperature, heating time, and the like in case of heat-curing) are to be appropriately selected depending on the type and amount of the cationic polymerization initiator to be contained in the cationic curable composition, the type of the other cationically polymerizable compound, and the like.

When the cationic curable composition is a photo cationically curable composition, it is suitable to conduct photoirradiation by a conventionally known photoirradiation apparatus or the like, as a curing method therefor. Examples of the photoirradiation apparatus include a low-pressure mercury lamp, an intermediate-pressure mercury lamp, a high-pressure mercury lamp, an ultrahigh-pressure mercury lamp, a chemical lamp, a black-light lamp, a micro-wave excitation mercury lamp, a metal halide lamp, an electrodeless UV lamp, an LED, and the like, each having a light emission range at a wavelength of 400 nm or shorter.

The intensity of photoirradiation onto a coating film may be appropriately selected depending on the purpose, usage, and the like. The photoirradiation intensity within a light wavelength range (typically, light having a wavelength of 300 to 420 nm is used, though it is varied depending on the type of a photo cationic polymerization initiator) effective for activating the photo cationic polymerization initiator, is preferably 0.1 to 100 mW/cm².

The irradiation energy is to be appropriately set depending on the type of active energy source, a blended composition, and the like. The irradiation energy is also appropriate to select a time of photoirradiation onto a coating film depending on the purpose, usage, and the like thereof, such that an integrated light quantity represented by a product of the photoirradiation intensity within the light wavelength range and the photoirradiation time, is to be preferably set at a range from 10 to 5,000 mJ/cm², more preferably from 500 to 3,000 mJ/cm², and further preferably from 2,000 to 3,000 mJ/cm², Thus, insofar as the integrated light quantity is kept within the above range, curing of the composition is smoothly progressed, thereby enabling to readily obtain a uniformly cured product.

Although most of the coating film components are brought to be set-to-touch by virtue of cationic polymerization, 0.1 to several minutes after the photoirradiation, it is possible to combiningly use heating so as to promote the cationic polymerization reaction.

When the cationic curable composition is a thermally cationically curable composition, curing method and curing conditions are not particularly limited.

The curing temperature is preferably in the range from 80° C. to 200° C., and more preferably from 100° C. to 180° C. Within this range, the temperature may be fixed or elevated. Further, it is possible to combine a temperature elevation with a temperature fall. The curing time is selected depending on the type of the thermal cationic polymerization initiator, contents of the other component and the like. The curing time is usually in the range from 30 to 300 minutes, and preferably from 60 to 240 minutes. Curing the coating film under the above preferable conditions enables to form a uniformly cured film without cracks and the like, and to obtain an article having such a cured film.

In the article having the cured film of the present invention, the thickness of the cured film is not particularly limited and is preferably in the range from 0.1 to 100 μm, more preferably from 1 to 50 μm, and further preferably from 5 to 20 μm.

EXAMPLE

1. Production and Evaluation of Organosilicon Compound Having Oxetanyl Group

Example 1-1

400 g of methanol, 55.68 g (0.2 mol) of 3-ethyl-3-((3-(trimethoxysilyl)propoxy)methyl)oxetane represented by the following formula (4) (hereinafter, referred to as "TMSOX"), and 30.44 g (0.2 mol) of tetramethoxysilane (hereinafter, referred to as "TMOS") were charged into a reaction vessel provided with a stirrer and a thermometer. After that, 53.64 g of aqueous solution of 1.7% by weight of tetramethylammonium hydroxide (containing 3 mol of water, and 10 mmol of tetramethylammonium hydroxide) was gradually added into the reaction vessel. The resultant mixture was subjected to a reaction at a temperature of 25° C. and at pH 9 for 24 hours, with stirring. Then, 6.61 g (10.5 mmol) of aqueous solution of 10% by weight of nitric acid was added into the reaction liquid to neutralize it. Subsequently, the organic solvent (methanol) and water were distilledly removed therefrom under reduced pressure, and the obtained residue (reaction product) was then dissolved in methyl isobutyl ketone, followed by water washing to thereby remove salts, and an excessive acid. Thereafter, the solvent (methyl isobutyl ketone) was distilledly removed from the methyl isobutyl ketone solution under reduced pressure, to obtain an organosilicon compound (C-1), which was colorless and semisolid. The yield was 48.5 g.

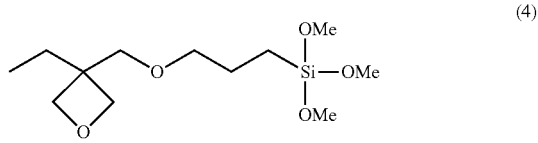

(4)

The organosilicon compound (C-1) was subjected to ¹H NMR analysis and IR (infrared absorption) analysis, to confirm a presence of an oxetanyl group.

¹H NMR analysis was conducted by precisely weighing and mixing about 1 g of the organosilicon compound (C-1) and about 100 mg of hexamethyldisiloxane (hereinafter, referred to as "HMDSO") as an internal standard substance and measuring based on a proton of HMDSO. The content of a structural unit (T monomer unit) derived from the silicon compound (A), i.e., derived from TMSOX, and the content of an alkoxy group in the organosilicon compound (C-1) were determined by ¹H NMR analysis. Based on these contents, the content of a structural unit (Q monomer unit) derived from the silicon compound (B), i.e., derived from TMOS, was calculated. As a result, the obtained organosilicon compound (C-1) was confirmed to be a copolycondensate by stoichiometric reaction of the silicon compound (A) and the silicon compound (B).

The content of the alkoxy group (methoxy group bonded to a silicon atom) of the organosilicon compound (C-1) calculated from ¹H NMR chart, was an amount corresponding to 1.0% based on the total amount of the alkoxy group contained in the starting materials.

In the organosilicon compound (C-1), the ratio of inorganic moiety was 42%.

The number-average molecular weight (Mn) of the organosilicon compound (C-1) was measured by gel permeation chromatography (GPC) using polystyrene standards to be Mn=4,000 (see, Table 1).

The organosilicon compound (C-1) was stored in a dark place at a temperature of 60° C. in the atmospheric air for 3 days, and solubilities thereof in THF and propylene glycol monoethyl ether acetate (hereinafter, referred to as "PGMEA") at a temperature of 25° C. were confirmed to be excellent, respectively.

The organosilicon compound (C-1) was dissolved in PGMEA to prepare a solution at a concentration of 50% by weight, and the solution was then left to stand still in a dark place at a temperature of 60° C. The number-average molecular weight and viscosity after each lapse of a predetermined time were listed in Table 2, respectively. Timewise changes were hardly observed. The viscosity was measured by E-type viscometer "VISCONIC-EMD" (type name) manufactured by Tokyo Keiki Inc.

Example 1-2

56.6 g of methanol, 8.35 g (0.03 mol) of TMSOX, and 2.28 g (0.015 mol) of TMOS were charged into a reaction vessel provided with a stirrer and a thermometer. After that, 4.1 g of aqueous solution of 2.5% by weight of tetramethylammonium hydroxide (containing 0.225 mol of water, and 1.13 mmol of tetramethylammonium hydroxide) was gradually added into the reaction vessel. The resultant mixture was subjected to a reaction at a temperature of 25° C. and at pH 9 for 2 hours, with stirring. Then, 0.72 g (1.14 mmol) of aqueous solution of 10% by weight of nitric acid was added into the reaction liquid to neutralize it. Subsequently, the organic solvent (methanol) and water were distilledly removed therefrom under reduced pressure, and the obtained residue (reaction product) was then dissolved in ethyl acetate, followed by water washing to thereby remove salts, and an excessive acid. Thereafter, the solvent (ethyl acetate) was distilledly removed from the ethyl acetate solution under reduced pressure, to obtain an organosilicon compound (C-2), which was colorless and transparent liquid. The yield was 7.34 g.

The organosilicon compound (C-2) was subjected to $^1$H NMR analysis and IR analysis, to confirm a presence of an oxetanyl group.

This organosilicon compound (C-2) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-2) calculated from $^1$H NMR chart, was an amount corresponding to 1.5% based on the total amount of the alkoxy group contained in the starting materials.

In the organosilicon compound (C-2), the ratio of inorganic moiety was 34%.

The number-average molecular weight, viscosity, and timewise changes of the organosilicon compound (C-2) were measured in the same manner as those in Example 1-1. The results are shown in Table 1 and Table 2.

Example 1-3

60 g of methanol, 8.35 g (0.03 mol) of TMSOX, and 19.8 g (0.075 mol) of tetrapropoxysilane were charged into a reaction vessel provided with a stirrer and a thermometer. After that, 20.5 g of aqueous solution of 1.2% by weight of tetramethylammonium hydroxide (containing 1.13 mol of water, and 2.6 mmol of tetramethylammonium hydroxide) was gradually added into the reaction vessel. The resultant mixture was subjected to a reaction at a temperature of 25° C. and at pH 9 for 2 hours, with stirring. Then, 1.7 g (2.7 mmol) of aqueous solution of 10% by weight of nitric acid was added into the reaction liquid to neutralize it. Subsequently, the organic solvent (methanol and propanol) and water were distilledly removed therefrom under reduced pressure, and the obtained residue (reaction product) was then dissolved in methyl isobutyl ketone, followed by water washing to thereby remove salts, and an excessive acid. Thereafter, the solvent (methyl isobutyl ketone) was distilledly removed from the methyl isobutyl ketone solution under reduced pressure, to obtain an organosilicon compound (C-3), which was colorless and semisolid. The yield was 11.4 g.

The organosilicon compound (C-3) was subjected to $^1$H NMR analysis and IR analysis, to confirm a presence of an oxetanyl group.

This organosilicon compound (C-3) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-3) calculated from $^1$H NMR chart, was an amount corresponding to 3.0% based on the total amount of the alkoxy group contained in the starting materials.

In the organosilicon compound (C-3), the ratio of inorganic moiety was 56%.

The number-average molecular weight, viscosity, and timewise changes of the organosilicon compound (C-3) were measured in the same manner as those in Example 1-1. The results are shown in Table 1 and Table 2.

Example 1-4

41 g of 1-propanol, and 6.23 g (0.04 mol) of tetramethoxysilane were charged into a reaction vessel provided with a stirrer and a thermometer. After that, 0.3 g of methanol solution of 25% by weight of tetramethylammonium hydroxide (containing 8 mmol of methanol, and 0.8 mmol of tetramethylammonium hydroxide) was gradually added into the reaction vessel. The resultant mixture was subjected to a reaction at a temperature of 25° C. and at pH 9 for 1 hour, with stirring. Thereafter, 5.52 g (0.02 mol) of TMSOX was added into the reaction liquid, followed by further addition of 4.07 g of water thereinto. Subsequently, 1.24 g of methanol solution of 25% by weight of tetramethylammonium hydroxide (containing 29 mmol of methanol, and 3.4 mmol of tetramethylammonium hydroxide) was added into the reaction liquid. The resultant mixture was subjected to a reaction at a temperature of 23° C. and pH 9 for 24 hours and thereafter at 60° C. for 4 hours, with stirring. Then, 2.78 g (4.4 mmol) of aqueous solution of 10% by weight of nitric acid was added into the reaction liquid to neutralize it. Subsequently, this reaction liquid was added into a mixed liquid of 160 g of ethyl acetate and 180 g of water to conduct extraction, thereby collecting an ethyl acetate layer containing a reaction product. The ethyl acetate layer was washed by water, to remove salts, and an excessive acid. Thereafter, the solvent (ethyl acetate) was distilledly removed from the ethyl acetate solution under reduced pressure, to obtain an organosilicon compound (C-4), which was colorless and transparent solid. The yield was 6.5 g.

The organosilicon compound (C-4) was subjected to $^1$H NMR analysis and IR analysis, to confirm a presence of an oxetanyl group.

This organosilicon compound (C-4) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-4) calculated from $^1$H NMR chart, was an amount corresponding to 1.0% based on the total amount of the alkoxy group contained in the starting materials.

In the organosilicon compound (C-4), the ratio of inorganic moiety was 53%.

The number-average molecular weight, viscosity, and timewise changes of the organosilicon compound (C-4) were measured in the same manner as those in Example 1-1. The results are shown in Table 1 and Table 2.

Example 1-5

203.41 g of methanol, 27.98 g (0.1 mol) of TMSOX, and 22.84 g (0.15 mol) of TMOS were charged into a reaction vessel provided with a stirrer and a thermometer. After that, a mixed liquid of 6.38 g of methanol solution of 25% by weight of tetramethylammonium hydroxide (containing 0.15 mol of methanol, and 17.5 mmol of tetramethylammonium hydroxide), 16.22 g (0.9 mol) of water, and 22.6 g of methanol was gradually added into the reaction vessel. The resultant mixture was subjected to a reaction at a temperature of 20° C. and at pH 9 for 2 hours, with stirring. Then, 11.60 g (18.4 mmol) of aqueous solution of 10% by weight of nitric acid was added into the reaction liquid to neutralize it. Subsequently, the organic solvent (methanol) and water were distilledly removed therefrom under reduced pressure, and the obtained residue (reaction product) was then dissolved in PGMEA, followed by water washing to thereby remove salts, and an excessive acid. Thereafter, PGMEA and the like were distilledly removed from the PGMEA solution under reduced pressure, to obtain an organosilicon compound (C-5), which was colorless solid. The yield was 27.25 g (91%).

The organosilicon compound (C-5) was subjected to $^1$H NMR analysis and IR analysis, to confirm a presence of an oxetanyl group.

This organosilicon compound (C-5) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-5) calculated from $^1$H NMR chart, was an amount corresponding to 3.2% based on the total amount of the alkoxy group contained in the starting materials.

In the organosilicon compound (C-5), the ratio of inorganic moiety was 47%.

The organosilicon compound (C-5) was subjected to GPC measurement and the compound was found containing components exceeding a detection limit (molecular weight of 400,000) of the column. Further, the chromatogram had a ratio of 5:5 between an area of components (retention time=6 to 10 minutes) exceeding the detection limit of the column and an area of components (retention time=11 to 16 minutes; Mn=2,900 within this range) not exceeding the detection limit.

The number-average molecular weight, viscosity, and timewise changes of the organosilicon compound (C-5) were measured in the same manner as those in Example 1-1. The results are shown in Table 1 and Table 2.

Example 1-6

203.41 g of methanol, 27.98 g (0.1 mol) of TMSOX, and 22.84 g (0.15 mol) of TMOS were charged into a reaction vessel provided with a stirrer and a thermometer. After that, a mixed liquid of 6.38 g of methanol solution of 25% by weight of tetramethylammonium hydroxide (containing 0.15 mol of methanol, and 17.5 mmol of tetramethylammonium hydroxide), 16.22 g (0.9 mol) of water, and 22.6 g of methanol was gradually added into the reaction vessel. The resultant mixture was subjected to a reaction to a temperature of 60° C. and at pH 9 for 2 hours, with stirring. Then, 11.60 g (18.4 mol) of aqueous solution of 10% by weight of nitric acid was added into the reaction liquid to neutralize it. Subsequently, the organic solvent (methanol) and water were distilledly removed therefrom under reduced pressure, and the obtained residue (reaction product) was then dissolved in PGMEA, followed by water washing to thereby remove salts, and an excessive acid. Thereafter, PGMEA and the like were distilledly removed from the PGMEA solution under reduced pressure, to obtain an organosilicon compound (C-6), which was colorless solid. The yield was 27.55 g (92%).

The organosilicon compound (C-6) was subjected to $^1$H NMR analysis and IR analysis, to confirm a presence of an oxetanyl group.

This organosilicon compound (C-6) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-6) calculated from $^1$H NMR chart, was an amount corresponding to 3.0% based on the total amount of the alkoxy group contained in the starting materials.

In the organosilicon compound (C-6), the ratio of inorganic moiety was 47%.

The number-average molecular weight, viscosity, and timewise changes of the organosilicon compound (C-6) were measured in the same manner as those in Example 1-1. The results are shown in Table 1 and Table 2.

Comparative Example 1-1

430 g of methanol, 55.68 g (0.2 mol) of TMSOX, and 30.44 g (0.2 mol) of TMOS were charged into a reaction vessel provided with a stirrer and a thermometer. After that, 25.5 g of aqueous solution of 0.7% by weight of hydrochloric acid (containing 1.4 mol of water, and 4.8 mmol of hydrogen chloride) was gradually added into the reaction vessel. The resultant mixture was subjected to a reaction at a temperature of 25° C. and at pH 5 for 18 hours, with stirring. Since the acid was not left in the reaction liquid, neutralization with a basic substance was not conducted. After that, the solvent (methanol) was distilledly removed under reduced pressure, to obtain an organosilicon compound (C-7), which was colorless and transparent liquid. Since the acid was not left in the reaction product, water washing thereof was not conducted. The yield was 60.2 g.

The organosilicon compound (C-7) was subjected to $^1$H NMR analysis and IR analysis, to confirm a presence of an oxetanyl group.

This organosilicon compound (C-7) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-7) calculated from $^1$H NMR chart, was an amount corresponding to 9.0% based on the total amount of the alkoxy group contained in the starting materials.

In the organosilicon compound (C-7), the ratio of inorganic moiety was 39%.

The number-average molecular weight, viscosity, and timewise changes of the organosilicon compound (C-7) were measured in the same manner as those in Example 1-1. The results are shown in Table 1 and Table 3.

Comparative Example 1-2

An organosilicon compound (C-8) was produced in the same manner as those in Comparative Example 1-1, except that the amount of hydrogen chloride as an acid catalyst was changed to 10 mmol.

The organosilicon compound (C-8) was subjected to $^1$H NMR analysis and IR analysis, to confirm a presence of an oxetanyl group.

This organosilicon compound (C-8) was also confirmed to be a copolycondensate by stoichiometric reaction of the silicon compound (A) and the silicon compound (B), based on the same $^1$H NMR analysis as that in Example 1-1.

The content of the alkoxy group (methoxy group bonded to a silicon atom) of the organosilicon compound (C-8) calculated from ¹H NMR chart, was an amount corresponding to 9.1% based on the total amount of the alkoxy group contained in the starting materials.

In the organosilicon compound (C-8), the ratio of inorganic moiety was 39%.

The number-average molecular weight, viscosity, and timewise changes of the organosilicon compound (C-8) were measured in the same manner as those in Example 1-1. The results are shown in Table 1 and Table 3.

Comparative Example 1-3

60 g of methanol, 6.35 g (0.03 mol) of TMSOX, and 23.8 g (0.09 mol) of tetrapropoxysilane were charged into a reaction vessel provided with a stirrer and a thermometer. After that, 24.5 g of aqueous solution of 1.1% by weight of tetramethylammonium hydroxide (containing 1.35 mol of water, and 3 mmol of tetramethylammonium hydroxide) was gradually added into the reaction vessel. The resultant mixture was subjected to a reaction at a temperature of 25° C. and at pH 9 for 2 hours, with stirring. Then, 1.92 g (3.06 mmol) of aqueous solution of 10% by weight of nitric acid was added into the reaction liquid to neutralize it. Subsequently, the organic solvent (methanol) and water were distilledly removed therefrom under reduced pressure, and the obtained residue (reaction product) was then dissolved in methyl isobutyl ketone, followed by water washing to thereby remove salts, and an excessive acid. Thereafter, the solvent (methyl isobutyl ketone) was distilledly removed from the methyl isobutyl ketone solution under reduced pressure, but the residue was gelated, thereby failing to obtain an organosilicon compound.

Comparative Example 1-4

133.6 g (0.48 mol) of TMSOX, and 118.4 g of isopropyl alcohol were charged into a reaction vessel provided with a stirrer and a thermometer. After that, the mixture was subjected to bubbling by nitrogen gas and internal temperature of the mixture was controlled to a temperature of 80° C. 4.38 g (12 mmol) of 25% by weight of tetramethylammonium hydroxide and 22.66 g of water were dropped into the mixture while stirring to react at a temperature of 80° C. and at pH 9 for 1 hour. Then, 2.47 g of 25% by weight of sulfuric acid was added into the reaction liquid, to neutralize it. Subsequently, the organic solvent (methanol) and water were distilledly removed therefrom under reduced pressure, and the obtained residue (reaction product) was then dissolved in methyl isobutyl ketone, followed by water washing to thereby remove salts, and an excessive acid. Thereafter, the solvent (methyl isobutyl ketone) was distilledly removed from the methyl isobutyl ketone solution under reduced pressure, to obtain an organosilicon compound (C-10), which was colorless, transparent and viscous liquid. The yield was 101.3 g.

In the organosilicon compound (C-10), the ratio of inorganic moiety was 25%.

The number-average molecular weight, viscosity, and timewise changes of the organosilicon compound (C-10) were measured in the same manner as those in Example 1-1. The results are shown in Table 1 and Table 3.

Comparative Example 1-5

56.6 g of methanol, 8.35 g (0.03 mol) of TMSOX, and 2.28 g (0.015 mol) of TMOS were charged into a reaction vessel provided with a stirrer and a thermometer. After that, 25.5 g of aqueous solution of 0.7% by weight of hydrochloric acid (containing 1.4 mol of water, and 4.8 mmol of hydrogen chloride) was gradually added into the reaction vessel. The resultant mixture was subjected to a reaction at a temperature of 25° C. and at pH 5 for 18 hours, with stirring. Since the acid was not left in the reaction liquid, neutralization with a basic substance was not conducted. After that, the solvent (methanol) was distilledly removed under reduced pressure, to obtain an organosilicon compound (C-11), which was colorless and transparent liquid. Since the acid was not left in the reaction product, water washing thereof was not conducted. The yield was 5.44 g.

The organosilicon compound (C-11) was subjected to ¹H NMR analysis and IR analysis, to confirm a presence of an oxetanyl group.

This organosilicon compound (C-11) was also confirmed to be a copolycondensate by stoichiometric reaction of the silicon compound (A) and the silicon compound (B), based on the same ¹H NMR analysis as that in Example 1-1.

The content of the alkoxy group (methoxy group bonded to a silicon atom) of the organosilicon compound (C-11) calculated from ¹H NMR chart, was an amount corresponding to 9.3% based on the total amount of the alkoxy group contained in the starting materials.

In the organosilicon compound (C-11), the ratio of inorganic moiety was 31%.

The number-average molecular weight, viscosity, and timewise changes of the organosilicon compound (C-11) were measured in the same manner as those in Example 1-1. The results are shown in Table 1 and Table 3.

TABLE 1

|  | Organosilicon compound (C) | pH of reaction system | Mn | Viscosity (mPa · s) | Solubility (After storing in dark place at 60° C. for 3 days) | |
|---|---|---|---|---|---|---|
|  |  |  |  |  | THF | PGMEA |
| Example 1-1 | C-1 | 9 | 4,000 | 70 | ○ | ○ |
| Example 1-2 | C-2 | 9 | 2,800 | 60 | ○ | ○ |
| Example 1-3 | C-3 | 9 | >10,000 | 100 | ○ | ○ |
| Example 1-4 | C-4 | 9 | 3,800 | 70 | ○ | ○ |
| Example 1-5 | C-5 | 9 | >10,000 | 80 | ○ | ○ |
| Example 1-6 | C-6 | 9 | 5,000 | 80 | ○ | ○ |
| Comparative Example 1-1 | C-7 | 5 | 1,300 | 130 | * | * |
| Comparative Example 1-2 | C-8 | 5 | 1,300 | 120 | * | * |
| Comparative Example 1-3 | C-9 * | 9 | — | — | — | — |
| Comparative Example 1-4 | C-10 | 9 | 1,900 | 50 | ○ | ○ |
| Comparative Example 1-5 | C-11 | 5 | 1,500 | 107 | * | * |

* Gelation was caused.

TABLE 2

|  | Example 1-1 Organosilicon compound (C-1) | | Example 1-2 Organosilicon compound (C-2) | | Example 1-3 Organosilicon compound (C-3) | | Example 1-4 Organosilicon compound (C-4) | | Example 1-5 Organosilicon compound (C-5) | | Example 1-6 Organosilicon compound (C-6) | |
|---|---|---|---|---|---|---|---|---|---|---|---|---|
|  | Mn | Viscosity (mPa·s) | Mn | Viscosity (mPa·s) | Mn | Viscosity (mPa·s) | Mn | Viscosity (mPa·s) | Mn | Viscosity (mPa·s) | Mn | Viscosity (mPa·s) |
| Just after production | 4,000 | 70 | 2,800 | 60 | — | 100 | 3,800 | 70 | >10,000 | 80 | 5,000 | 80 |
| After 1 day | 3,900 | 72 | 2,800 | 61 | — | 103 | 3,800 | 70 | >10,000 | 81 | 5,000 | 80 |
| After 2 days | 3,900 | 70 | 2,800 | 65 | — | 110 | 3,700 | 74 | >10,000 | 85 | 4,900 | 82 |
| After 3 days | 4,000 | 71 | 2,900 | 63 | — | 111 | 3,800 | 74 | >10,000 | 90 | 5,000 | 81 |

TABLE 3

|  | Comparative Example 1-1 Organosilicon compound (C-7) | | Comparative Example 1-2 Organosilicon compound (C-8) | | Comparative Example 1-4 Organosilicon compound (C-10) | | Comparative Example 1-5 Organosilicon compound (C-11) | |
|---|---|---|---|---|---|---|---|---|
|  | Mn | Viscosity (mPa·s) | Mn | Viscosity (mPa·s) | Mn | Viscosity (mPa·s) | Mn | Viscosity (mPa·s) |
| Just after production | 1,300 | 130 | 1,300 | 120 | 1,900 | 50 | 1,500 | 107 |
| After 1 day | * | * | * | * | 2,000 | 50 | * | * |
| After 2 days | * | * | * | * | 2,000 | 48 | * | * |
| After 3 days | * | * | * | * | 2,000 | 49 | * | * |

* Gelation was caused.

Example 2-1

90 parts by weight of the organosilicon compound (C-1), 10 parts by weight of (3,4-epoxycyclohexyl)methyl-3,4-epoxycyclohexyl carboxylate, and 2 parts by weight of (tricumyl)iodonium tetrakis(pentafluorophenyl)borate as a photo cationic polymerization initiator were dissolved in 102 parts by weight of PGMEA as a solvent to prepare a PGMEA solution (photo cationically curable composition) at a concentration of 50% by weight.

The photo cationically curable composition was evaluated for curability, hardness and wear resistance. The results are shown in Table 4.

(1) Curability Test

The photo cationically curable composition was coated onto a glass substrate or a steel plate using a bar coater, followed by heating at a temperature of about 50° C. for 5 minutes to volatilize a solvent (PGMEA), thereby forming a coating film having a thickness of about 15 μm. After that, the coating film was cured by ultraviolet irradiation under the following condition, in a manner to count the number of irradiations until the coating film lost a tackiness of its surface.

Condition of Ultraviolet Irradiation

Lamp: 80 W/cm high-pressure mercury lamp
Lamp height: 10 cm
Conveyor speed: 10 m/min.

(2) Pencil Hardness Test

The photo cationically curable composition was coated onto a glass substrate or a steel plate, followed by heating at a temperature of about 50° C. for 5 minutes to volatilize a solvent (PGMEA), thereby forming a coating film having a thickness of about 15 μm. After that, the coating film was cured by ultraviolet irradiation under the same conditions (3 times of ultraviolet irradiation) as those in the curability test, thereby obtaining a cured film.

This cured film was left to stand still within a thermostatic chamber at a temperature of 23° C. and a humidity of 60% for 24 hours, followed by measurement of a pencil hardness of a surface of the cured film according to JIS K 5600-5-4.

(3) Universal Hardness Test

The photo cationically curable composition was coated onto a glass substrate or a steel plate, followed by heating at a temperature of about 50° C. for 5 minutes to volatilize a solvent (PGMEA), thereby forming a coating film having a thickness of about 15 μm. After that, the coating film was cured by ultraviolet irradiation under the same conditions (3 times of ultraviolet irradiation) as those in the curability test, thereby obtaining a cured film.

This cured film was left to stand still within a thermostatic chamber at a temperature of 23° C. and a humidity of 60% for 24 hours, followed by measurement of a universal hardness at a maximum load of 1 mN/20 sec.

(4) Taber Abrasion Test

The photo cationically curable composition was coated onto a glass substrate or a steel plate using a bar coater, followed by heating at a temperature of about 50° C. for 5 minutes to volatilize a solvent (PGMEA), thereby forming a coating film having a thickness of about 15 μm. After that, the coating film was cured by ultraviolet irradiation under the same conditions (5 times of ultraviolet irradiation) as those in the curability test, thereby obtaining a cured film.

This cured film was left to stand still within a thermostatic chamber at a temperature of 23° C. and a humidity of 60% for 24 hours, followed by achievement of Taber abrasion test under the following condition.

The test condition was to use a "CS-10F" as an abrasion wheel in a manner to apply a load of 250 g thereto, thereby measuring an abrasion loss after 500 revolutions. The abrasion wheel was subjected to refacing by "ST-11" (grindstone), each measurement.

Further, hazes of the cured film before and after Taber abrasion test under the above condition were measured according to JIS K 7105, JIS K 7361-1, and JIS K 7136, by a hazemeter installed within a thermostatic chamber at a temperature of 23° C.±2° C. and a humidity of 50%±5% RH, respectively.

Example 2-2

A photo cationically curable composition was prepared in the same manner as those in Example 2-1 except that the organosilicon compound (C-4) was used instead of the organosilicon compound (C-1). Then, a measurement was conducted except pencil hardness test, universal hardness test and abrasion loss measurement (see, Table 4). It is noted that the number of ultraviolet irradiation times was set to be 15 times, upon producing a cured film for Taber abrasion test.

Example 2-3

A photo cationically curable composition was prepared in the same manner as those in Example 2-1 except that the organosilicon compound (C-3) was used instead of the organosilicon compound (C-1). Then, a measurement was conducted except pencil hardness test, universal hardness test and abrasion loss measurement (see, Table 4). It is noted that the number of ultraviolet irradiation times was set to be 15 times, upon producing a cured film for Taber abrasion test.

Example 2-4

A PGMEA solution at a concentration of 50% by weight (photo cationically curable composition) was prepared by dissolving 100 parts by weight of the organosilicon compound (C-1) and 2 parts by weight of (tricumyl)iodonium tetrakis(pentafluorophenyl)borate as a photo cationic polymerization initiator into 102 parts by weight of PGMEA as a solvent. Then, a measurement was conducted except pencil hardness test, universal hardness test and abrasion loss measurement (see, Table 4). It is noted that the number of ultraviolet irradiation times was set to be 15 times, upon producing a cured film for Taber abrasion test.

Example 2-5

A PGMEA solution at a concentration of 50% by weight (photo cationically curable composition) was prepared by dissolving 90 parts by weight of the organosilicon compound (C-1), 10 parts by weight of an epoxy compound "Q-4" represented by the following general formula (5), (it is a cage-shaped silsesquioxane having a glycidyl group and is one kind of "Q8 serires" manufactured by Mayaterials Inc.) and 2 parts by weight of (tricumyfliodonium tetrakis(pentafluorophenyl)borate as a cationic polymerization initiator into 102 parts by weight of PGMEA as a solvent. Then, a measurement was conducted except pencil hardness test, universal hardness test and abrasion loss measurement (see, Table 4). It is noted that the number of ultraviolet irradiation times was set to be 15 times, upon producing a cured film for Taber abrasion test.

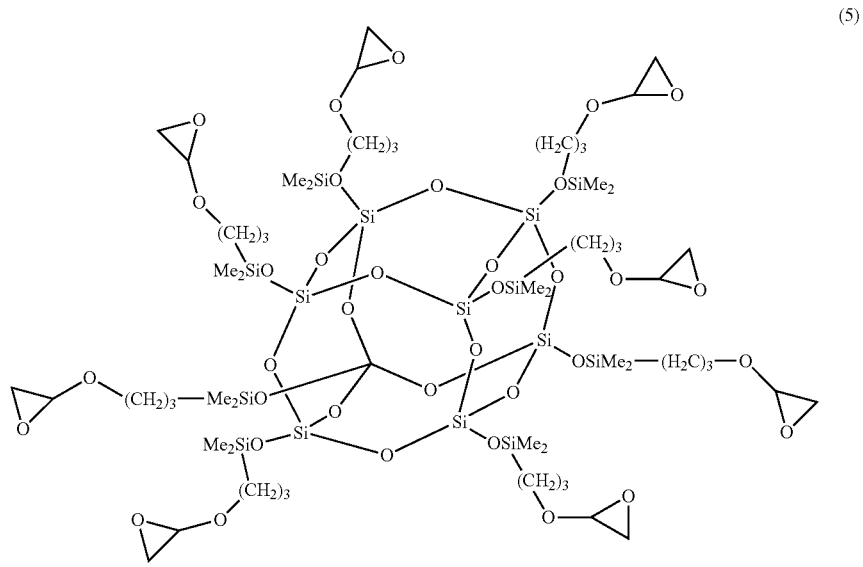

(5)

Example 2-6

A photo cationically curable composition was prepared in the same manner as those in Example 2-5 except that the organosilicon compound (C-4) was used instead of the organosilicon compound (C-1). Then, a measurement was conducted except pencil hardness test, universal hardness test and abrasion loss measurement (see, Table 4). It is noted that the number of ultraviolet irradiation times was set to be 15 times, upon producing a cured film for Taber abrasion test.

Comparative Example 2-1

A photo cationically curable composition was prepared in the same manner as those in Example 2-1 except that the organosilicon compound (0-7) was used instead of the organosilicon compound (C-1). Then, evaluation was conducted (see, Table 4).

TABLE 4

| | Curability (number of irradiation times) | Pencil hardness | | Universal hardness (N/mm$^2$) | | Abrasion loss (mg) | Haze (%) | | |
|---|---|---|---|---|---|---|---|---|---|
| | | Glass plate | Steel plate | Glass plate | Steel plate | | Before abrasion ($H_1$) | Before abrasion ($H_2$) | ΔH * (%) |
| Example 2-1 | 1 | 3H | 5H | 130 | 133 | 0.5 | 0.29 | 9.64 | 9.35 |
| Example 2-2 | 1 | — | — | — | — | 0.4 | 0.21 | 8.31 | 8.10 |
| Example 2-3 | 1 | — | — | — | — | 0.3 | 0.33 | 6.24 | 5.91 |
| Example 2-4 | 1 | — | — | — | — | 0.6 | 0.13 | 13.06 | 12.93 |
| Example 2-5 | 1 | — | — | — | — | 0.3 | 0.19 | 5.67 | 5.48 |
| Example 2-6 | 1 | — | — | — | — | 0.4 | 0.20 | 7.21 | 7.01 |
| Comparative Example 2-1 | 1 | H | 5H | 90 | 83 | 1.0 | 0.20 | 21.09 | 20.89 |

* ΔH = $H_2$—$H_1$

As is clearly from Table 4, the compositions (Examples 2-1 to 2-6) containing the organosilicon compounds obtained by the production method of the present invention provided cured films excellent in hardness and wear resistance. This is considered to be because, each organosilicon compound (C) containes a hydrolyzate of tetrafunctional silane (Q monomer unit) as a constitutional unit, and thus has a higher ratio of inorganic moiety. Further, the fact that the increased amounts (ΔH) of haze were small in Examples 2-1 to 2-6, indicates that the cured film was insusceptible to scratches.

INDUSTRIAL APPLICABILITY

The organosilicon compound of the present invention has a high proportion of an inorganic part in the structure, and is excellent in stability and storage stability after the production thereof. The organosilicon compound has a cationic curability.

The curable composition of the present invention provides a cured product, which is high in surface hardness and excellent in wear resistance. Additionally, this composition has a cationic curability, and the cured product obtained from the composition is useful as a hardcoat, a protective film for various base materials, a resist coating, a modifier of various polymer materials, a reinforcing agent of plastic, a modifier of various coating materials, a starting material for a coating material, a material having low dielectric constant, a material for insulating film, a material for providing heat resistance, a starting material for a liquid crystal, a material for encapsulating a semiconductor, a material for an optical waveguide, a material for a hard mask, and the like.

What is claimed is:

1. An organosilicon compound having an oxetanyl group, characterized in that said organosilicon compound is obtained by a method comprising a process in which a silicon compound (A) represented by the general formula (1) and a silicon compound (B) represented by the general formula (2) are subjected to hydrolysis and condensation under an alkaline condition, at a ratio of 0.3 to 2.8 mol of said silicon compound (B) based on 1 mol of said silicon compound (A)

(1)

wherein R$^0$ is an organic group represented by the general formula (3)

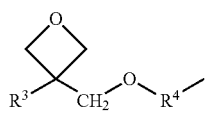
(3)

wherein R$^3$ is a hydrogen atom or an alkyl group having 1 to 6 carbon atoms, and R$^4$ is an alkylene group having 2 to 6 carbon atoms, R$^1$ is an alkyl group having 1 to 6 carbon atoms, an aralkyl group having 7 to 10 carbon atoms, an aryl group having 6 to 10 carbon atoms, or an organic group having an oxetanyl group, X is a hydrolyzable group, and n is 0 or 1;

SiY$_4$ (2)

wherein Y is a siloxane-bond forming group and the silicon compound (B) contains a single Si atom.

2. The organosilicon compound having an oxetanyl group according to claim 1, wherein said organosilicon compound comprises a silicate unit represented by [SiO$_{4/2}$] and a silsesquioxane unit represented by [R$^0$SiO$_{3/2}$].

3. The organosilicon compound having an oxetanyl group according to claim 1, wherein X in said general formula (1) is an alkoxy group, a cycloalkoxy group or an aryloxy group.

4. A method for producing an organosilicon compound having an oxetanyl group according to claim 1, characterized in that said method comprises a process in which a silicon compound (A) represented by the general formula (1) and a silicon compound (B) represented by the general formula (2) are subjected to hydrolysis and condensation under an alkaline condition, at a ratio of 0.3 to 2.8 mol of said silicon compound (B) based on 1 mol of said silicon compound (A).

5. The method for producing an organosilicon compound having an oxetanyl group according to claim 4, wherein the amount of a basic substance for alkaline condition is in the range from 1 to 20 mol based on 100 mol of the total mol number of said silicon compound (A) and said silicon compound (B).

6. The method for producing an organosilicon compound having an oxetanyl group according to claim 5, wherein said basic substance is a tetraalkylammonium hydroxide.

7. A cationic curable composition characterized by comprising an organosilicon compound having an oxetanyl group according to claim 1, and a cationic polymerization initiator.

8. The cationic curable composition according to claim 7, wherein said cationic polymerization initiator is a photo cationic polymerization initiator.

9. A method for producing a cured film, characterized by comprising a coating process in which a cationic curable composition according to claim 7 is coated on a surface of a base material to obtain a coating film and a curing process in which said coating film is cured.

10. A method for producing an article having a cured film, characterized by comprising a coating process in which a cationically curable composition according to claim 7 is coated on a surface of a base material to obtain a coating film and a curing process in which said coating film is cured.

11. The method for producing an article having a cured film according to claim 10, wherein said base material is a substrate comprising a polycarbonate resin.

12. An article having a cured film obtained by the method according to claim 10.

13. The cationic curable composition according to claim 7 or 8, wherein said composition further comprises another cationic polymerizable compound, and wherein said cationic polymerizable compound is a compound selected from the group consisting of an epoxy compound, a compound having an oxetanyl group, and a vinylether compound.

14. A method for producing a cured film, characterized by comprising a coating process in which a cationically curable composition according to claim 13 is coated on a surface of a base material to obtain a coating film and a curing process in which said coating film is cured.

15. The organosilicon compound of claim 1, wherein the silicon compound (B) is a tetraalkoxysilane.

16. The organosilicon compound of claim 1, wherein the silicon compound (B) is at least one selected from the group consisting of $Si(OCH_3)_4$, $Si(OC_2H_5)_4$, $Si(OC_3H_7)_4$, $Si(OC_4H_9)_4$, $H_3SiOCH_3$, $H_3SiOC_2H_5$, $H_3SiOC_3H_7$, $H_2Si(OCH_3)_2$, $H_2Si(OC_2H_5)_2$, $H_2Si(C_3H_7)_2$, $HSi(OCH_3)_3$, $HSi(OC_2H_5)_3$, $HSi(C_3H_7)_3$, $HSi(OH)_3$, $H_2Si(OH)_2$, $H_3Si(OH)$ and $SiH_4$.

17. The organosilicon compound of claim 1, having a viscosity of from 60 to 110 mPa·s.

18. The organosilicon compound of claim 1, having a number average molecular weight of from 3,700 to 5,000.

* * * * *